(No Model.)
C. F. BURNAP.
STEAM COOKING UTENSIL.
No. 475,435. Patented May 24, 1892.
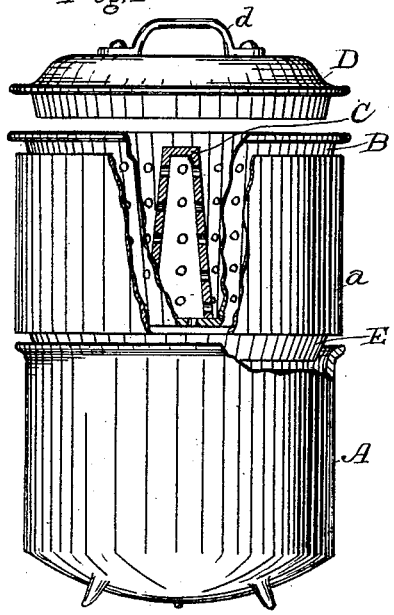
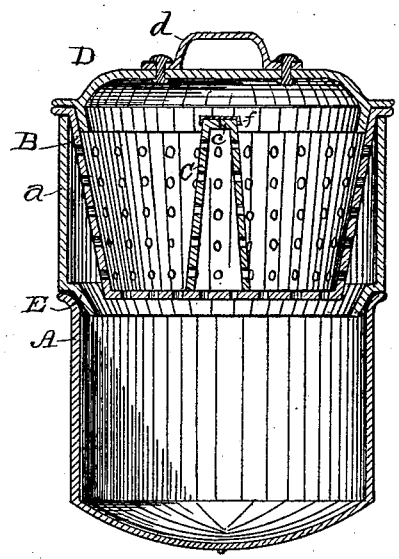
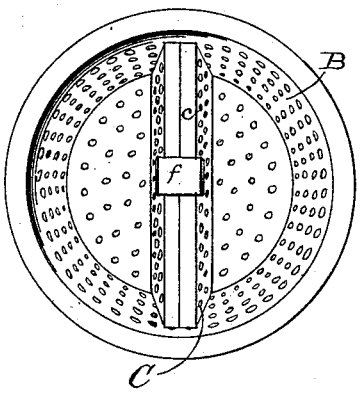
WITNESSES
Loren R. Vorce
Loren Prentiss
INVENTOR
Charles F. Burnap
by C. M. Vorce
ATTORNEY
THE NORRIS PETERS CO., PHOTO-LITHO., WASHINGTON, D. C.

UNITED STATES PATENT OFFICE.

CHARLES F. BURNAP, OF WARREN, OHIO.

STEAM COOKING UTENSIL.

SPECIFICATION forming part of Letters Patent No. 475,435, dated May 24, 1892.

Application filed December 31, 1891. Serial No. 416,650. (No model.)

*To all whom it may concern:*

Be it known that I, CHARLES F. BURNAP, a citizen of the United States, residing at Warren, in the county of Trumbull and State of Ohio, have invented certain new and useful Improvements in Steam Cooking Utensils; and I do hereby declare the following to be a full, clear, and exact description of the invention, such as will enable others skilled in the art to which it pertains to make and use the same.

My invention relates to the class of utensils designed for cooking by the direct application of steam, and although capable of extensive application is especially designed for household use.

The object of the invention is to secure increased efficiency in use, wide range of adaptability, ease of cleaning, and cheapness of construction; and it consists in the construction, arrangement, and combination of parts hereinafter described, and specifically pointed out in the claims.

In the drawings, Figure 1 is a view in elevation of the complete device, with its parts slightly separated and with portions broken away, the better to show the structure and relation of parts. Fig. 2 is a central vertical section of the complete device with the parts in position for use. Fig. 3 is a plan view of the vessel B, with the partition C in place, as seen from above with the cover D removed.

The essential features of the device are: an outer impervious shell, which may be itself the steam-generating vessel or may be adapted to fit into or upon a separate vessel in which the steam is generated; an inner perforated shell or vessel to receive the material to be cooked, said perforated shell closing the outer impervious shell and leaving a steam-space between the two; a removable partition separating the perforated vessel into compartments, and serving also by means of perforations through the partition to admit steam to the interior or central portions of the material to be cooked, and an impervious cover closing the vessel to confine the steam therein.

The drawings show a form of the device adapted to household use, for which purpose it is most convenient to have the steam-generating vessel separate from the rest of the device to enable it to be applied as well to other uses. For cooking large quantities, as for stock, &c., it is more convenient to have the outer impervious shell integral with the steam-generating vessel.

In the drawings, A represents an ordinary kettle, which is utilized as the steam-generating vessel.

*a* represents the imperforate outer sleeve-like shell of the cooking utensil, adapted to fit on the kettle A, substantially steam-tight.

B represents the perforated inner shell or vessel, which is in the form of an open pan and receives the material to be cooked, and which fits tightly into the top of the shell *a*, but is reduced in diameter, so as to leave a steam-space between the two shells and permit access of steam to the extreme top of the inner shell.

The shell B is perforated throughout its bottom and sides to admit steam freely at all points, and by varying the number or size of the perforations in different parts of the vessel B the relative proportion of steam admitted at any particular part of the vessel may be regulated.

C represents the removable perforated partition, which, as seen in Fig. 3, extends across the vessel B, dividing it into compartments, in each of which a different substance may be cooked at the same time. By adding lateral wings to the partition C the number of compartments into which the vessel B is divided may be increased to four or more, and these lateral wings need not be hollow or perforated unless desired or unless the vessel B is unusually large.

D represents an ordinary cover with usual handle *d*, closing the vessel B tightly enough to confine the steam at the pressure employed in cooking, but which yields to a pressure lower than is required to lift the outer shell *a* with its load.

To insure a close fit of the shell *a* upon the vessel A, the lower part of *a* is formed with an inwardly-extending conical portion E, which not only insures a tight joint, but enables the shell *a* and other parts to be used upon different sizes of kettles.

In cooking by the direct application of steam difficulty is often experienced to avoid cooking the outer portions most freely exposed to the steam before the inner portions are sufficiently cooked, and this difficulty is aggravated when the material to be cooked has a tendency to soften and mass together in cooking. To avoid this, I introduce the perforated partition, by means of which the material is supported and kept from massing together, and by thus supporting the material a central channel for the steam is formed along the partition, and as the perforations in the partition allow the steam to circulate freely from one side of the partition to the other the steam is thereby introduced directly into the central portions of the mass, and the latter is thus more evenly cooked.

In cooking large quantities of material—such, for instance, as roots or grain—the importance of preventing the mass as it softens in cooking from sinking and massing together is strikingly apparent, and the efficiency of the perforated partition for that purpose is obvious. I prefer, however, when a considerable quantity of material is to be cooked to make the partition C hollow to permit the more free and speedy access of steam to the central part of the mass, and this I accomplish either by forming the partition with a hollow interior, or preferably by the means shown in Fig. 2, of forming the partition with a flange against which another partition may be placed, so as to leave a space between the two. c in the drawings represents this flange. By this means the single perforated partition may be used alone, being quite sufficient in many cases, or the second partition may be added to it when required, forming a hollow partition, the two parts being secured together by any suitable common form of catch. f indicates such a catch or clasp.

On removing the partition both the perforated vessel B and the partition or partitions are more easily and perfectly accessible for cleaning than would be the case if the partition were permanently attached to the shell or vessel B, which is of importance, especially in household cooking.

What I claim as my invention, and desire to secure by Letters Patent, is—

1. The combination, in a steam cooking utensil, of a steam-generating vessel, a perforated cooking-vessel fitting thereon, a hollow perforated partition removably inserted in the cooking-vessel, and a cover closing the apparatus to confine the steam therein, substantially as described.

2. The combination, in a steam cooking utensil, of a perforated cooking-vessel adapted to fit upon a steam-generating vessel, a cover to confine the steam therein, and a removable perforated hollow partition fitting in the cooking-vessel, substantially as described.

3. The combination, in a steam cooking utensil, of a perforated cooking-vessel adapted to fit upon a steam-generating vessel, a cover to confine the steam therein, and the removable perforated partition adapted to fit into the cooking-vessel and having a flange whereby a steam-space may be formed and maintained between the partitions, substantially as described.

4. The combination, in a steam cooking utensil, of a perforated cooking-vessel adapted to fit upon a steam-generating vessel with a steam-space between the sides of the two vessels, a cover to confine the steam, and a hollow removable perforated partition fitting in the cooking-vessel, substantially as described.

5. The combination, in a steam cooking utensil, of the imperforate sleeve fitting upon a steam-generating vessel, the perforated cooking-vessel fitting within said sleeve, with a steam-space between the sides of the two, the cover closing the apparatus to confine the steam, and the removable hollow perforated partition fitting in said cooking-vessel, substantially as described.

In witness whereof I hereunto set my hand in the presence of two witnesses, this 28th day of December, A. D. 1891.

CHARLES F. BURNAP.

In presence of—
O. J. CAMPBELL,
WM. G. TAYLOR.